Sept. 1, 1953  C. C. DUBBS  2,650,409
PROCESS AND APPARATUS FOR MOLDING CONCRETE PRODUCTS
Filed Oct. 26, 1949  3 Sheets-Sheet 2
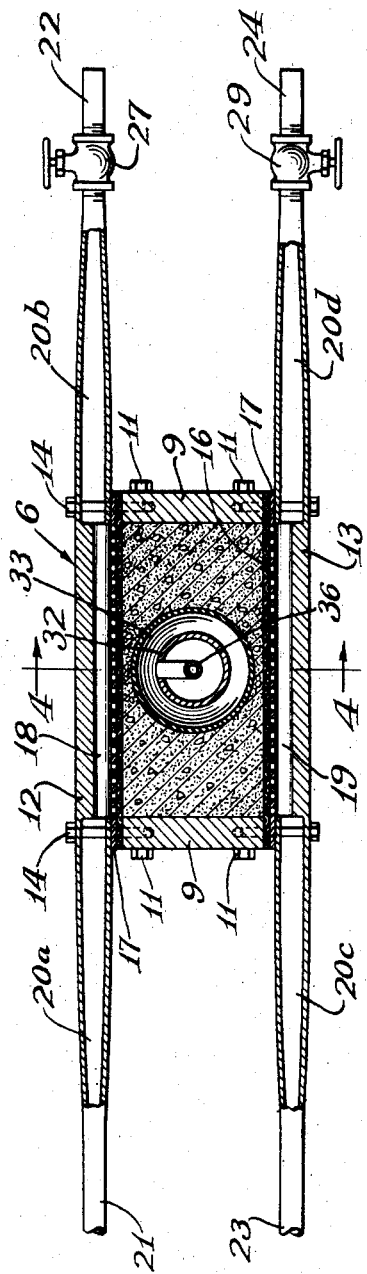
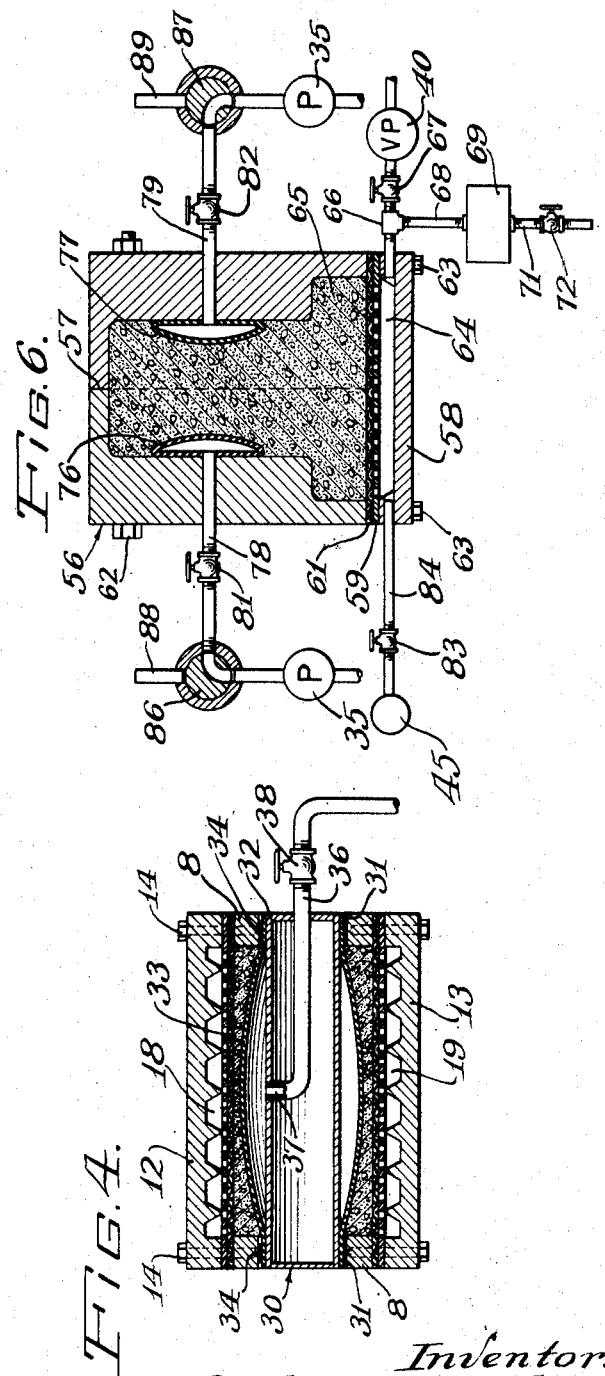
Inventor:
Carbon C. Dubbs
By Lee J. Gary
Attorney

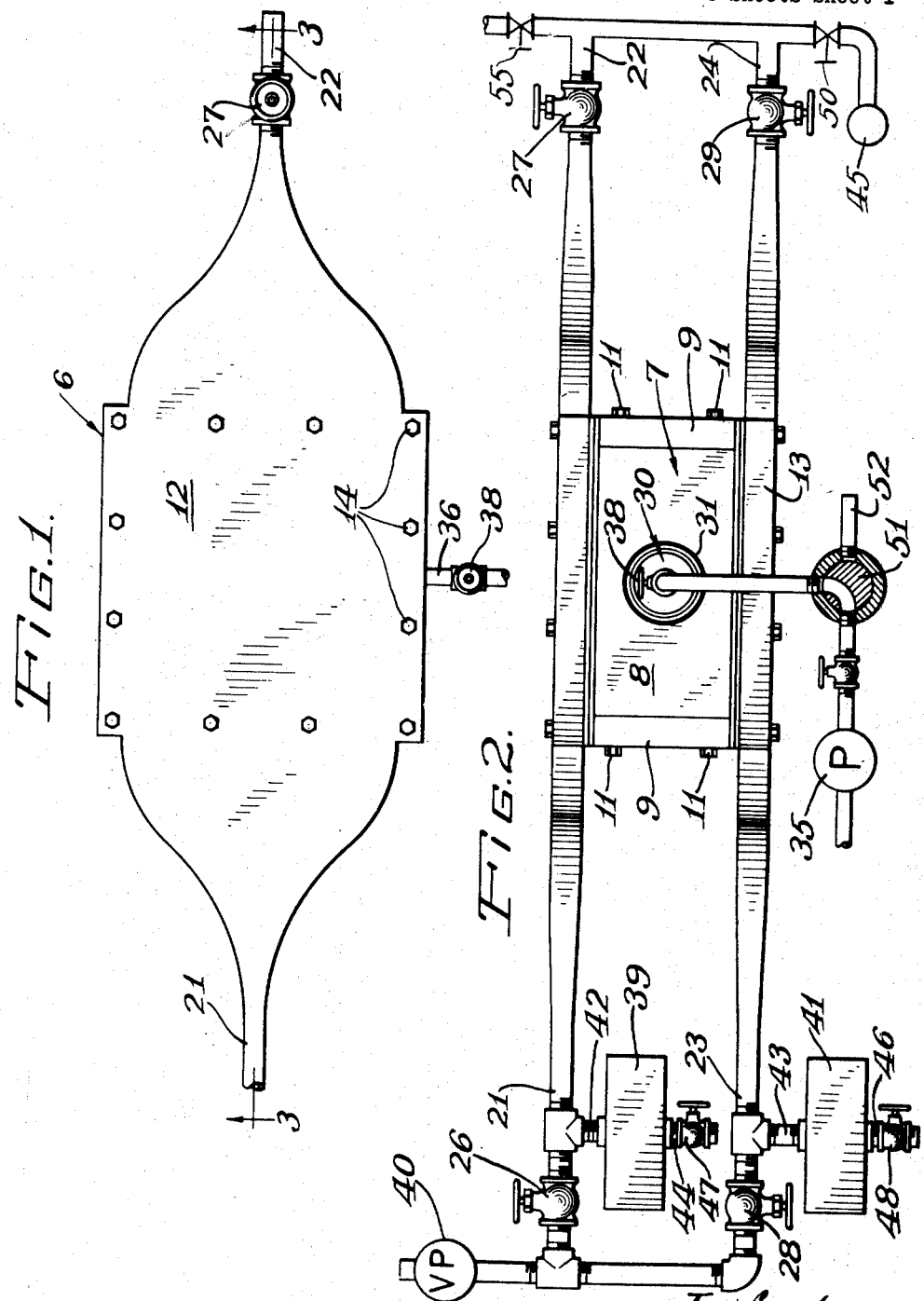

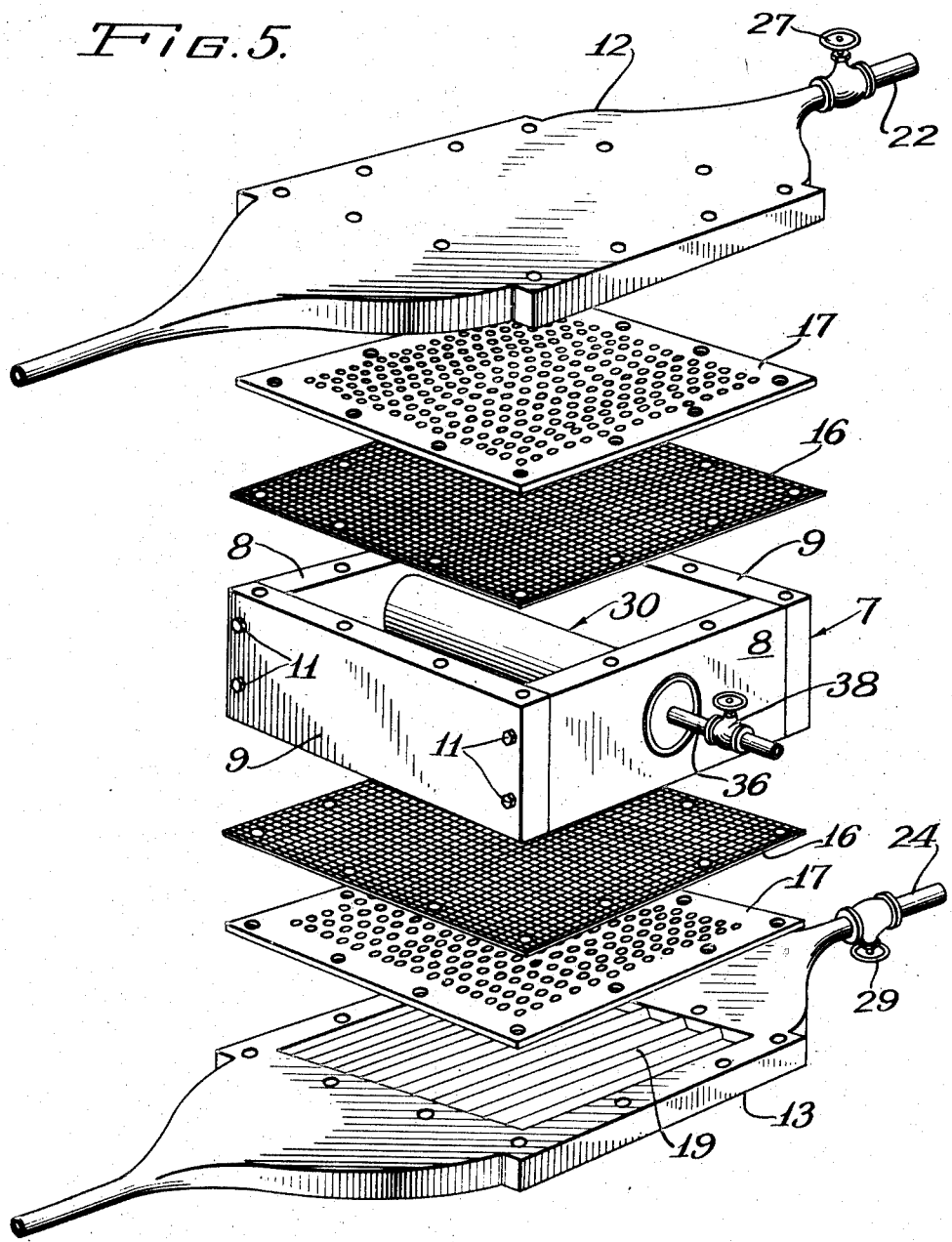

Patented Sept. 1, 1953

2,650,409

UNITED STATES PATENT OFFICE 2,650,409

PROCESS AND APPARATUS FOR MOLDING CONCRETE PRODUCTS

Carbon C. Dubbs, Orange, Calif.

Application October 26, 1949, Serial No. 123,656

11 Claims. (Cl. 25—118)

This invention relates to a method and apparatus for molding concrete products, and is more particularly concerned with the provision of a method and apparatus suitable for use in the manufacture of concrete products, such as building blocks, slabs, beams, posts, etc. The present application is a continuation-in-part of my copending application Serial No. 121,802, filed October 17, 1949.

Manufacturers have heretofore employed two methods in forming concrete products; one method employing the use of a relatively dry concrete mix, and the other method embodying the use of a relatively wet concrete mix. The dry pack method consists in consolidating a very dry concrete mix within a mold by ramming and/or vibration and then ejecting the product from the mold to permit immediate re-use of the mold. The dry pack method has certain inherent disadvantages in that the product has approximately 25% voids which tend to materially decrease the physical properties of the product, the mold must be left open at one end and the excess concrete removed from said open end prior to ejection of the product from the mold, the concrete product has a tendency to slump after its removal from the mold if the mix is not very accurately controlled, the molded product is limited to one finished surface, and the size and shape of the product is definitely limited due to the method of molding.

In molding a very fluid concrete mix, it has heretofore been the practice to pour the mix into a mold and then permit the concrete to harden within the mold. This method has heretofore been used for forming concrete joists, some types of concrete pipe, statuary, etc. This method of molding a wet concrete mix has certain inherent disadvantages in that the mix has a high water-cement ratio which reduces the compressive strength of the material, produces surface bubbles of air and water, and causes undesirable shrinkage, checking, cracking and crazing. Concrete with a high water-cement ratio has a tendency to dust and is high in water absorption since the excess water which is not necessary for chemical reaction of the cement resides temporarily within the concrete causing bubbles and canals therethrough. A further disadvantage inherent in the relatively wet concrete mix method is that the molded product cannot be removed from the mold until the concrete has had sufficient time to set, which period may run from several hours to a full day. Even in applying a vacuum alone to the outer surface of the concrete, it would take a long period of time to withdraw sufficient excess water out so that the concrete could be removed from the mold and it would still retain an excess of water as the mineral aggregate would not be compacted as it is when water is squeezed out by internal pressure.

The present method and apparatus contemplates the use of a relatively wet concrete mix in which it is not essential to closely control the water-cement ratio, the mix being sufficiently fluid to facilitate handling and transportation and when poured into a mold will assume the shape of the interior of the mold. After the relatively wet mix is poured into a mold, internal pressure is applied inside of the mix to force the mix to all parts of the inner surface of the mold to compact the mixture and at the same time to force out excess water through suitable filter screens arranged within the walls of the mold. It has been found that by thus expressing the excess water from the mix within the mold, a majority of the water-voids are closed up, thereby producing a product having greater strength and less absorption, shrinkage and wear. In other words, the method hereinafter described consists in removing the excess water from the mix within the mold prior to initial set of the concrete in order to improve the physical properties of the concrete product, and to also cause the mix to reach a "no-slump" consistency for immediate removal from the mold.

This invention further contemplates the provision of a method and apparatus in which internal pressure is applied to the mix within a mold to express excess water from the mix through one or more filter screens provided within the walls of the mold, the mold being formed with a water outlet chamber on the outer side of each filter screen to receive the excess water from the mix and to prevent the excess water from reentering the mix when the internal pressure within the mix is relieved. The excess water is removed from the water outlet chamber prior to reduction of the internal pressure within the mix.

This invention further contemplates the provision of a method and apparatus in which pressure or vacuum induced blasts of hot or cold air or steam are employed for removing excess water from the surface of the filter screens and the surface of the concrete product adjacent thereto, the method employed for removing this excess water being determined by the characteristics of the concrete mix and by the end results desired. The purpose of the blasts of air or steam is to remove and so prevent the expelled water from re-entering the concrete mix when the internal pressure therein is relieved.

Products manufactured by the method hereinafter set forth are accurate to the dimensions of the mold, have a controllable and predetermined surface finish, are relatively free of surface dusting, shrinkage, cracks and surface crazing, are compact, uniform and substantially free of voids. The molded products are so highly compacted prior to initial set that they can be immediately removed from the mold without appreciable change of shape or size.

This invention further contemplates the provision of a process wherein the concrete mix is in a highly fluid state in order that it may be placed in the mold without vibration and still fill restricted voids within the mold, the mix being sufficiently fluid to permit pumping, pouring or otherwise handling as a fluid.

This invention further contemplates the provision of a process wherein any reasonable variation in the volume of the concrete mix placed in a mold will be compensated for without damage to the physical properties or appearance of the finished product.

This invention further contemplates the provision of a process wherein the density, compactness and water-cement ratio of the concrete mix may be varied at will without materially affecting the quality of the product.

This invention embodies other novel features, details of construction and arrangement of parts which are hereinafter set forth in the specification and claims, and illustrated in the accompanying drawings, wherein:

Fig. 1 is a top plan view illustrating a molding apparatus embodying features of the present invention.

Fig. 2 is a side elevational view of same.

Fig. 3 is a longitudinal sectional view taken along the line 3—3 of Fig. 1.

Fig. 4 is a transverse sectional view taken along the line 4—4 of Fig. 3.

Fig. 5 is a perspective explosion view illustrating the construction and arrangement of parts embodied in the molding apparatus.

Fig. 6 is a transverse sectional view illustrating a modified form of molding apparatus.

Referring now to the drawings for a better understanding of this invention, the molding apparatus is shown as comprising a mold 6 having a body 7 formed of two side plates 8—8 and two end plates 9—9, the end plates being secured to the side plates by means of cap screws 11. Top and bottom covers 12 and 13, respectively, are secured to opposite faces of the body 7 by means of cap screws 14. Interposed between each cover and the body 7 is provided a relatively fine mesh filter screen 16 and an apertured plate 17, the filter screens 16—16 being disposed adjacent the mold body 7 and the apertured plates 17—17 being disposed adjacent their respective covers.

The covers 12 and 13 are recessed on their inner faces to form water outlet chambers 18 and 19, respectively. Passageways 20a and 20b lead outwardly through the ends of the cover 12 from the chamber 18 to conduits 21 and 22. Passageways 20c and 20d are formed in the cover 13 to lead outwardly from the chamber 19 to communicate with conduits 23 and 24. Valves 26 and 27 are interposed in the conduits 21 and 22, respectively, and valves 28 and 29 are interposed in the conduits 23 and 24, respectively.

Core openings 31—31 are formed in the side walls 8—8 of the mold body 7 to snugly receive the ends of a core 30. The core 30 comprises a cylindrical metal mandrel 32 and a sleeve 33 of resilient material, such as rubber, the sleeve being mounted over the mandrel and securely engaged thereto at its ends by means of locking bands 34. The locking bands 34 are adapted to provide an air-tight engagement between the sleeve 33 and the mandrel 32. A conduit 36 leads inwardly through one end of the mandrel 32 and thence laterally at 37 to the surface of the mandrel to direct air or other fluid into the space between the sleeve and the mandrel to inflate and expand the sleeve 33. During expansion of the sleeve 33, it first acts to engage the surfaces defining the openings 31—31 and thus serves as a seal to prevent the concrete from leaking out of the mold. The conduit 36 leads to a pump 35 or other suitable source of air or other fluid under pressure and is provided with a suitable control valve 38. It is contemplated that any number of cores 30 may be arranged within the mold and that they may be of any practical shape.

Conduits 21 and 23 are adapted to be connected to a suitable vacuum pump 40; while the conduits 22 and 24 lead to the atmosphere and also to an air compressor or steam generator 45. Water accumulators 39 and 41 are connected to their respective conduits 21 and 23 by means of conduits 42 and 43, respectively. The water accumulators 39 and 41 are provided with drain conduits 44 and 46, respectively, controlled by valves 47 and 48, respectively.

In the manufacture of concrete products in a molding apparatus of the type thus shown and described, the valve 38 in the conduit 36 is first opened to permit compressed air or fluid under pressure to enter the space between the mandrel 32 and sleeve 33 to cause the sleeve to expand. During expansion of the sleeve 33, it first acts to seal itself against the walls of the openings 31. The mold is then filled with the concrete mix, the cover 12 is secured in place and the sleeve is then further expanded to exert internal pressure against the concrete mix within the mold. As the sleeve expands it expresses excess water from the concrete mix, the excess water passing toward and through the filter screens 16—16 and apertured plates 17—17 into the water outlet chambers 18 and 19. The major portion of the water within the chambers 18 and 19 is caused to flow therefrom by gravity through the conduits 21 and 23 and thence through the conduits 42 and 43 into the water accumulators 39 and 41.

My copending patent application Serial No. 121,802 discloses a method and apparatus in which the major portion of the excess water within the water outlet chambers 18 and 19 flows by gravity into the accumulators 39 and 41; after which, the remaining excess water is removed from the chambers, the filter screens and the surface of the concrete adjacent thereto by operating the vacuum pump 40. The present invention contemplates the removal of the excess water from the water outlet chambers 18 and 19, filter screens and the surface of the concrete adjacent thereto by means of blasts of hot or cold air or steam from an air compressor or steam generator, indicated schematically at 45. While most of the excess water may be removed from the chambers 18 and 19 by gravity, it will be appreciated that some of the excess water will tend to adhere to the filter screens and to the surface of the compacted concrete mix adjacent thereto. By directing blasts of hot or cold air or steam through the water outlet chambers while the expansible sleeve 33 is in its inflated condition applying pressure internally of the mix, the excess water is removed from the filter screen and the adjacent surface of the compacted concrete mix by either entrainment or evaporation. In the molding operation, it is also contemplated that the bulk of the excess water may first be removed from the chambers 18 and 19 by directing pressure induced blasts of air or steam therethrough, and then removing any remaining excess water from the chambers, filter screens, etc., by entrainment and evaporation in vacuum induced blasts of aeriform fluid. It is thus possible in the operation of the method and apparatus herein disclosed to thereafter reduce the internal pressure within the mix by deflating the expansible sleeve 33 without having any of the expressed excess water re-entering the mix.

It will, of course, be apparent that the vacuum condition within the chambers 18 and 19 and the internal pressure exerted by the sleeve 33 against the concrete mix may each be varied depending upon the amount of excess water which is to be removed from the mix and the length of time employed during the molding operation. By setting up an internal pressure within the mold by means of the expansible sleeve, it will be noted that the concrete mix is forced into all the corners and other restricted portions of the mold to insure a smooth exterior appearance for the finished product. It will also be apparent that the internal pressure exerted by the inflatable sleeve 33 acts to reduce the voids within the mix to a minimum, thereby producing a concrete product having relatively high physical properties.

After the excess water has been removed from the concrete mix, a three-way valve 51 leading to the atmosphere through a conduit 52 is first opened to deflate the sleeve 33. The valves 26, 28 and 50 are then closed, and the valves 27, 29, 55, 47 and 48 are opened. The core 30 is then withdrawn from the mold and the cover 13 and its respective filter screen 16 and apertured plate 17 are removed from the mold and replaced by a suitable pallet (not shown). The rest of the mold is then disassembled and the concrete product is removed on the pallet.

Referring now more particularly to Fig. 6 in the drawings, a modified form of molding apparatus is shown as comprising a split mold 56 divided along the line 57. The mold 56 is provided with a cover 58, an apertured plate 59 and a filter screen 61 to close one face of the mold. The two sections of the mold 56 are secured together by any suitable means, such as bolts 62, and the cover 58 is secured to the mold by means of cap screws 63. The cover 58 is formed with a water outlet chamber 64 to receive excess water expressed from the concrete mix 65. When desired, a vacuum condition is created within the chamber 64 by means of a suitable vacuum pump 40 which communicates with the chamber through a conduit 66 controlled by a valve 67. The major portion of the excess water is adapted to flow by gravity from the chamber 64 through conduit 66 and thence through the conduit 68 into a water accumulator 69. A conduit 71, normally closed by a valve 72, leads from the water accumulator 69 to the atmosphere. A conduit 84 having a valve 83 interposed therein leads from the chamber 64 to either an air compressor or steam generator 45, depending upon the type of aeriform fluid desired.

A pair of inflatable rubber tubes 76 and 77 are preferably disposed in opposing relation against opposite side walls of the mold 56. The tubes 76 and 77 are inflated by means of compressed air or other fluid passing through conduits 78 and 79, respectively, under the control of valves 81 and 82, respectively.

In molding concrete products in the mold thus described, the mold is filled with a relatively fluid concrete mix and the cover 58 is secured in position to close the mold. The valves 81 and 82 are then opened to permit air or other fluid to pass from the pumps 35 into the tubes 76 and 77. During expansion of the tubes 76 and 77 an internal pressure condition is created within the relatively wet concrete mix 65 to express the excess water through the filter screen 61 and apertured plate 59 into the water outlet chamber 64 and thence through the conduits 66 and 68 into the water accumulator 69. While the tubes 76 and 77 are in their expanded condition, blasts of hot or cold air or steam, induced by pressure, vacuum, or both, as heretofore described in connection with the preceding form of this invention, are directed through the conduit 84 and thence through the chamber 64 to remove the excess water from the chamber, filter screen 61 and the concrete adjacent thereto by entrainment and evaporation. After a predetermined amount of the excess water has been expressed from the concrete mix and removed from the mold in the manner described, a pair of three-way valves 86 and 87 are operated to permit the air or fluid within the tubes 76 and 77 to pass outwardly to the atmosphere through conduits 88 and 89. The valve 67 in the conduit 66 leading to the vacuum pump is closed, the valve 83 in the conduit 84 leading to the air compressor or steam generator 45 is closed, and the valve 72 is opened. The concrete product is then removed from the mold 56 by removing the cap screws 63 and bolts 62 and then moving the two sections of the mold laterally away from each other.

The type of mold illustrated in Figs. 1 to 5 in the drawings is particularly adapted for use in forming concrete blocks or other products requiring a relatively smooth exterior surface of predetermined dimensions. The molding apparatus illustrated in Fig. 6 in the drawings is particularly suitable for use in molding concrete posts, joists, slabs, and the like in which it is not essential to provide uniform exterior surfaces to exact dimensions.

In the operation of the two forms of apparatus herein shown and described, it will be noted that sufficient excess water is provided in the concrete mix to render the same sufficiently fluid to be poured into and to fill all parts of the mold. After the mold is closed, the expansible member is expanded by compressed air or fluid to force the concrete mix against all the inner surfaces of the mold and at the same time to compact the mix and to force the excess water within the mix through suitable filters embodied in the mold. While the mix is thus subjected to internal pressure the majority of the excess water is adapted to flow by gravity through the filter screen into a water outlet chamber and thence into a water accumulator, while any excess water remaining on the filter screen and the surface of the compacted concrete mix adjacent thereto is carried away by either a pressure or vacuum induced blast of hot or cold air or steam or by a combination of pressure induced blasts followed by vacuum induced blasts employing either air or steam. The selection of any of the above methods for removing the excess water from the mix and from the filter screen and surface of the concrete mix must necessarily be governed by the characteristics of the concrete fluid mix and by the end results desired. The purpose of the blasts of air or steam is to remove and thus prevent the expelled excess water from re-entering the compacted concrete mix when the internal pressure exerted by the expansible member is reduced. All of the steps in the molding process herein set forth are carried out prior to any initial set of the concrete mix, the compacted concrete mix being removed from the mold and disposed in any suitable place, upon a pallet, to acquire an initial set. The internal pressure exerted by the expansible member may vary from a few pounds per square inch to any pressure necessary to bring about the desired results, but the minimum pressure exerted must squeeze a sufficient amount of excess water out of the concrete mix to permit immediate demolding of the compacted concrete mix without causing same to slump or change its shape.

Pressure induced blasts of hot or cold air may be directed through the water outlet chambers 18 and 19 of the apparatus illustrated in Figs. 1 to 5 by means of the air compressor indicated at 45, the valves 27, 29, 47 and 48 being opened and the valves 26 and 28 being closed. By alternately opening and then closing the valve 50, it will be apparent that blasts of hot or cold air may be directed through the chambers 18 and 19 to remove excess water from the filter screens 16—16 and the adjacent surface of the concrete mix by entrainment or evaporation.

In creating a vacuum induced blast of air through the water outlet chambers 18 and 19, the valves 26, 27, 28 and 29 are opened, and the valves 47, 48 and 50 are closed. By operating the vacuum pump 40 and by alternately opening and closing the valve 55, it will be noted that vacuum induced blasts of air are caused to pass through the chambers 18 and 19 to remove excess water from the filter screens and the surface of the concrete mix adjacent thereto by entrainment and evaporation. In the event it is found desirable to employ the use of hot air blasts for removing excess water by entrainment and evaporation, it is apparent that a suitable source of heated air may be provided and directed into the conduits 22 and 24 for movement through the chambers 18 and 19 during operation of either the vacuum pump 40 or air compressor 45.

While this invention has been shown in but two forms, it is obvious to those skilled in the art that it is not so limited but is susceptible of various changes and modifications without departing from the spirit and scope of the claimed invention.

I claim as my invention:

1. The method of molding a concrete product which comprises, placing a relatively fluid concrete mix within a closed mold, expanding a resilient imperforate surface by fluid pressure within the mix whereby the mix is compressed and conformed to the inner surfaces of the mold and excess water is forced out of the mix and the mold, and then while said mix is still subjected to internal pressure directing a blast of compressible fluid parallel to and into contact with an outer surface of the concrete mix to remove excess water from said outer surface.

2. The method of molding a concrete product which comprises, placing a relatively fluid concrete mix within a closed mold, expanding a resilient member by fluid pressure within the mix while preventing said fluid from entering said mix whereby the mix is compressed and conformed to the inner surfaces of the mold and excess water is forced out of the mix and the mold, and then while said mix is still subjected to internal pressure directing a blast of compressed air parallel to and into contact with an outer surface of the mix to remove excess water from said outer surface.

3. The method of molding a concrete product which comprises, placing a relatively fluid concrete mix within a closed mold, creating an internal pressure within the mix whereby the mix is compressed and conformed to the inner surfaces of the mold and excess water is forced out of the mix and the mold, and then while said mix is still in said mold removing the excess water from the outer surface of the concrete mix by a blast of steam under pressure.

4. In an apparatus for molding a concrete product, a closed mold to enclose a relatively fluid concrete mix, an imperforate expansible member disposed within said mold to compress and remove excess water from said mix, means defining a chamber within said mold adjacent the surfaces of the mix to receive excess water squeezed from said mix, and means to produce a blast of gas through said chamber to remove excess water from the adjacent outside surface of the concrete mix.

5. In an apparatus for molding a concrete product, a closed mold having opposite surfaces to enclose a relatively fluid concrete mix, an imperforate expansible member disposed within said mold to compress and remove excess water from said mix, means defining a chamber within said mold adjacent a pair of said opposite surfaces to receive excess water squeezed from said mix, and means to produce a blast of moving air through said chamber to remove excess water from the adjacent outside surfaces of the concrete mix.

6. In an apparatus for molding a concrete product, a closed mold to enclose a relatively fluid concrete mix, a fluid actuated imperforate expansible member disposed within said mold to compress and remove excess water from said mix, means defining a chamber within said mold adjacent a surface of the mix to receive excess water squeezed from said mix, and means to produce a blast of steam through said chamber to remove excess water from the adjacent outside surface of the concrete mix.

7. In an apparatus for molding a concrete product, a closed mold having a pair of opposite surfaces to enclose a relatively fluid concrete mix, an imperforate fluid actuated expansible member disposed within said mold to compress and remove excess water from said mix, means defining a chamber within said mold adjacent said pair of opposite surfaces to receive excess water squeezed from said mix, and means to provide a vacuum induced blast of gas through said chamber.

8. In an apparatus for molding a concrete product, a closed mold to enclose a relatively fluid concrete mix, an imperforate expansible member disposed within said mold, means for passing a compressible fluid under pressure to said expansible member to compress and remove excess water from said mix, means defining a chamber within said mold to receive excess water squeezed from said mix, means to provide a pressure induced blast of gas through said chamber, and means to provide a vacuum induced blast of gas through said chamber.

9. The method of molding a concrete product which comprises, placing a relatively fluid concrete mix within a closed mold, expanding a resilient imperforate surface by fluid pressure within the mix whereby the mix is compressed and conformed to the inner surfaces of the mold and excess water is forced out of the mix and the mold, and then, while said mold remains closed, directing a blast of compressed fluid parallel to and into contact with an outer surface of the concrete mix to remove excess water from said outer surface by entrainment.

10. The method of molding a concrete product which comprises, placing a relatively fluid concrete mix within a closed mold, expanding a resilient member by fluid pressure while preventing said fluid from entering the mix whereby the mix is compressed and conformed to the inner surfaces of the mold and excess water is forced out of the mix and the mold, and then, while said mold remains closed, directing a blast of compressed fluid parallel to and into contact with opposite outer surfaces of the concrete mix to remove excess water from said outer surfaces by entrainment.

11. The method of molding a concrete product which comprises, placing a relatively fluid concrete mix within a closed mold, creating a localized expansive force within the mix in the mold whereby the mix is compressed and conformed to the inner surfaces of the mold and excess fluid is forced out of the mix and the mold, and then, while said mold remains closed, directing a body of air at relatively high velocity parallel to and into contact with an outer surface of the concrete mix to remove excess fluid from said outer surface by entrainment.

CARBON C. DUBBS.

References Cited in the file of this patent

UNITED STATES PATENTS

| Number | Name | Date |
| --- | --- | --- |
| 1,149,669 | Mauersberger | Aug. 10, 1915 |
| 1,434,959 | Maier | Nov. 7, 1922 |
| 1,492,642 | Lake | May 6, 1924 |
| 1,552,064 | Lake | Sept. 1, 1925 |
| 1,711,027 | Luzzatti et al. | Apr. 30, 1929 |
| 2,311,358 | Baily | Feb. 16, 1943 |
| 2,528,643 | Dubbs | Nov. 7, 1950 |